(12) United States Patent
Kim (10) Patent No.: US 12,037,056 B2
(45) Date of Patent: Jul. 16, 2024

(54) STEER-BY-WIRE TYPE STEERING APPARATUS

(71) Applicant: HL MANDO CORPORATION, Gyeonggi-do (KR)

(72) Inventor: Ho Sik Kim, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 453 days.

(21) Appl. No.: 17/620,117

(22) PCT Filed: Jun. 18, 2020

(86) PCT No.: PCT/KR2020/007887
§ 371 (c)(1),
(2) Date: Dec. 17, 2021

(87) PCT Pub. No.: WO2020/256426
PCT Pub. Date: Dec. 24, 2020

(65) Prior Publication Data
US 2022/0234649 A1   Jul. 28, 2022

(30) Foreign Application Priority Data
Jun. 20, 2019 (KR) .................. 10-2019-0073267

(51) Int. Cl.
*B62D 5/00* (2006.01)
*B62D 5/04* (2006.01)
(52) U.S. Cl.
CPC ........... *B62D 5/0445* (2013.01); *B62D 5/001* (2013.01)

(58) Field of Classification Search
CPC .............................. B62D 5/001; B62D 5/0445
See application file for complete search history.

(56) References Cited

U.S. PATENT DOCUMENTS 8,869,930 B2   10/2014   Ishihara
2009/0114470 A1   5/2009   Shimizu et al.
(Continued)

FOREIGN PATENT DOCUMENTS

| CN | 206458699 | 9/2017 |
|----|-----------|--------|
| CN | 206493992 | 9/2017 |
| CN | 108516011 | 9/2018 |

(Continued)

OTHER PUBLICATIONS

International Search Report for PCT/KR2020/007887 mailed on Sep. 25, 2020 (now published as WO 2020/256426) with English translation provided by WIPO.

(Continued)

*Primary Examiner* — Kevin Hurley
(74) *Attorney, Agent, or Firm* — Womble Bond Dickinson (US) LLP (57) ABSTRACT

According to the present embodiments, it is possible to provide a steer-by-wire type steering apparatus which: limits a steering wheel operation of a driver within a maximum rotation angle, thereby increasing steering feel for the driver; prevents a clock spring installed on a steering wheel from being damaged, and enables parts to be manufactured and processed more easily; enables simple assembly; has small interference with surrounding parts, and thus the apparatus can be designed in various structures; and is advantageous in terms of packaging.

11 Claims, 7 Drawing Sheets

(56) References Cited

U.S. PATENT DOCUMENTS

2013/0218418 A1    8/2013  Ishihara
2023/0053581 A1*  2/2023  Jung ................... F16H 25/2266

FOREIGN PATENT DOCUMENTS

| | | | | |
|---|---|---|---|---|
| CN | 113135219 A | * | 7/2021 | .............. B62D 1/16 |
| DE | 102020110631 A1 | * | 10/2021 | |
| DE | 102021206212 A1 | * | 12/2021 | ............ B62D 5/001 |
| JP | 2005-047338 | | 2/2005 | |
| JP | 2005-186861 | | 7/2005 | |
| JP | 2010126031 | | 6/2010 | |
| KR | 10-2018-0097327 | | 8/2018 | |
| KR | 10-1944338 | | 1/2019 | |
| KR | 10-2019-0047369 | | 5/2019 | |
| KR | 20240024000 A | * | 1/2024 | |

OTHER PUBLICATIONS

Written Opinion of the International Searching Authority for PCT/KR2020/007887 mailed on Sep. 25, 2020 (now published as WO 2020/256426) with English translation provided by Google Translate.

Office Action dated Dec. 13, 2023 for Chinese Patent Application No. 202080044947.6 and its English machine translation by Google translate.

* cited by examiner

STEER-BY-WIRE TYPE STEERING APPARATUS

TECHNICAL FIELD

Embodiments of the present disclosure relate generally to a steer-by-wire steering apparatus and, more particularly, to a steer-by-wire steering apparatus limiting driver's operation of the steering wheel within a minimum angle of rotation so as to improve driver's feeling of steering and prevent a clock spring disposed on the steering wheel from being damaged, wherein parts of the steering apparatus may be more easily fabricated and machined and more simply fitted together, and the interference of the parts with surrounding components may be reduced, so that the steer-by-wire steering apparatus may be designed in a variety of structures and advantageous for packaging.

BACKGROUND ART

A steer-by-wire steering apparatus is a type of electric steering apparatus, and steers a vehicle using electric power without a mechanical connection, such as a steering column or a universal joint, between a steering wheel and a front wheel steering apparatus.

That is, driver's operation of the steering wheel is converted into an electrical signal. When the electrical signal is input into an electronic control device, the output of a motor is determined. Such an SBW system with no mechanical connection may reduce injury to a driver caused by a mechanical part in a collision accident. Since the mechanical connection and hydraulic parts may be removed, the weight of a vehicle may be reduced due to the reduced number of parts, and simplification such as significantly reduced line assembly work may be realized. In addition, unnecessary energy consumption during a steering operation may be reduced, thereby improving fuel efficiency. In addition, ideal steering performance may be realized by electronic control unit (ECU) programming.

Since there are no mechanical connections between a steering shaft and wheels, such a steer-by-wire steering apparatus requires a device limiting a driver so as not to further turn the steering wheel at a maximum angle. However, there is problem in that it has been difficult to fabricate, machine, and assembly parts of such a rotation limiting device of the related art.

DISCLOSURE

Technical Problem

Accordingly, embodiments of the present disclosure have been made in consideration of the above-described problems occurring in the related art and may provide a steer-by-wire steering apparatus limiting driver's operation of the steering wheel within a minimum angle of rotation so as to improve driver's feeling of steering and prevent a clock spring disposed on the steering wheel from being damaged, wherein parts of the steering apparatus may be more easily fabricated and machined and more simply fitted together, and the interference of the parts with surrounding components may be reduced, so that the steer-by-wire steering apparatus may be designed in a variety of structures and advantageous for packaging.

Technical Solution

According to embodiments of the present disclosure, provided is a steer-by-wire steering apparatus including: a leadscrew coupled to a steering shaft and including a first screw provided on an outer circumferential portion thereof; a first stopper and a second stopper coupled to one axial end portion and the other axial end portion of the leadscrew, respectively; a nut positioned between the first stopper and the second stopper, coupled to the leadscrew, and including a second screw provided on an inner circumferential portion thereof to engage with the first screw; and a hollow guide ring provided between a housing and the nut and supported on the nut in a circumferential direction. First insert recesses may be provided in an inner circumferential portion of the housing, and second insert recesses corresponding to the first insert recesses may be provided in an outer circumferential portion of the guide ring. The guide ring may be coupled to the housing by insert members inserted into the first insert recesses and the second insert recesses.

Advantageous Effects

According to embodiments of the present disclosure, the steer-by-wire steering apparatus can limit the driver's operation of the steering wheel within the minimum angle of rotation so as to improve driver's feeling of steering and prevent a clock spring disposed on the steering wheel from being damaged. Parts of the steering apparatus can be more easily fabricated and machined and more simply fitted together, and the interference of the parts with surrounding components can be reduced. The steer-by-wire steering apparatus can be designed in a variety of structures and advantageous for packaging.

BEST MODE

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
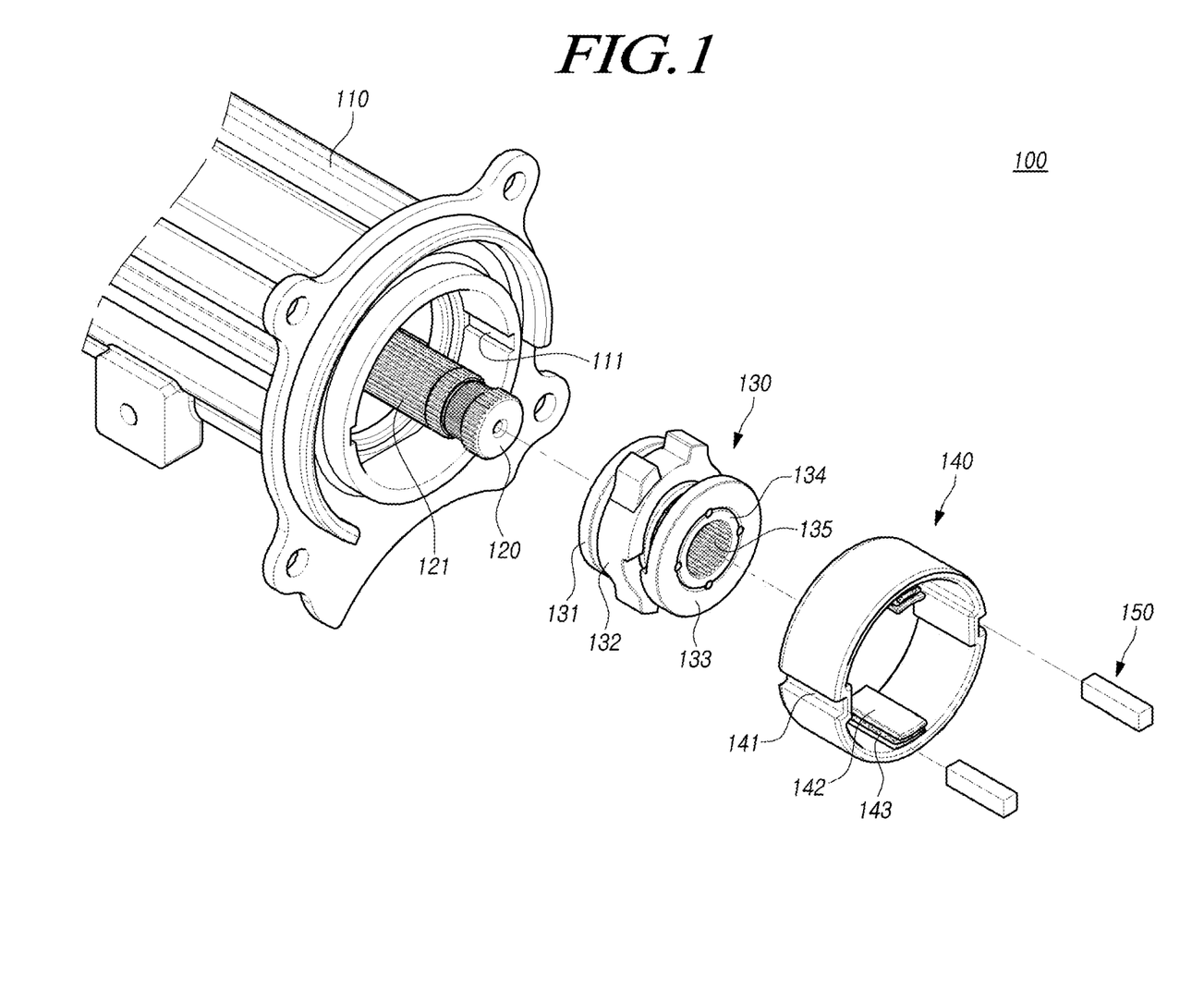
FIG. 1 is an exploded perspective view of a part of a steer-by-wire steering apparatus according to embodiments of the present disclosure.
Figure 2:
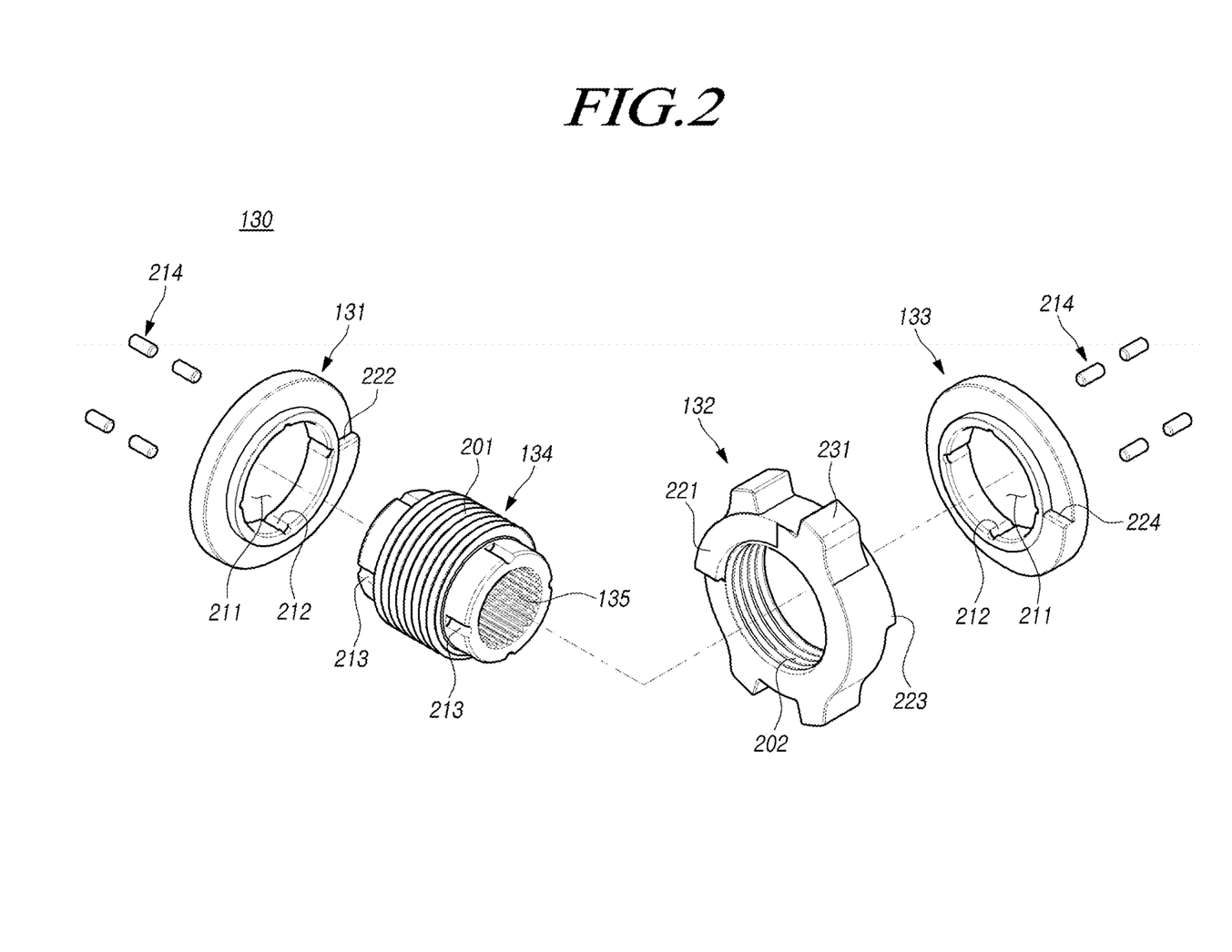
FIG. 2 is an exploded perspective view of a part of FIG. 1.
Figure 3:
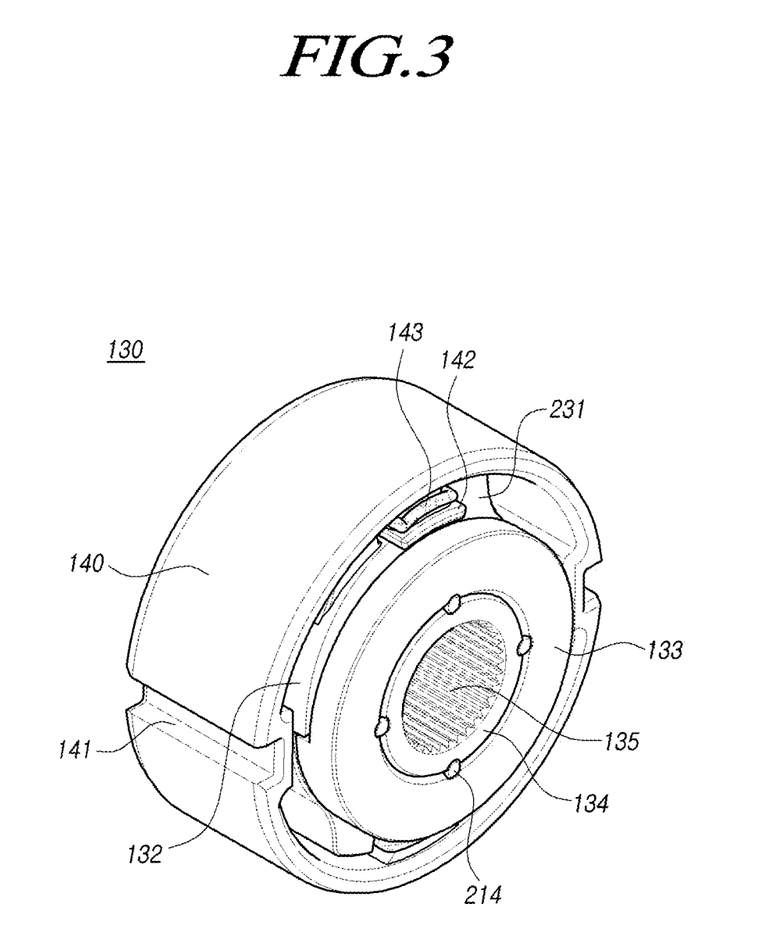
FIG. 3 is a perspective view of an assembled position of FIG. 1.
Figure 4:
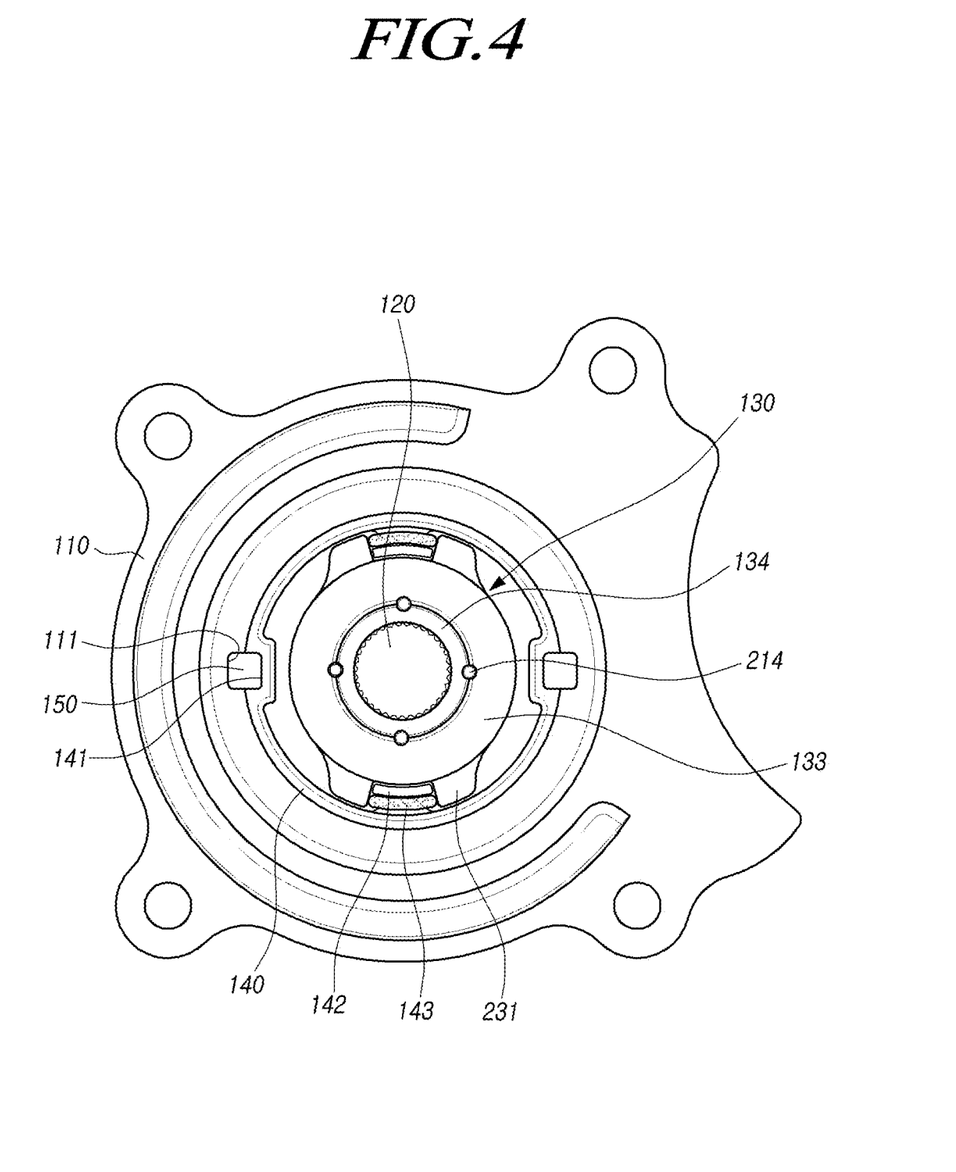
FIG. 4 is a front view of the assembled position of FIG. 2.
Figure 5:
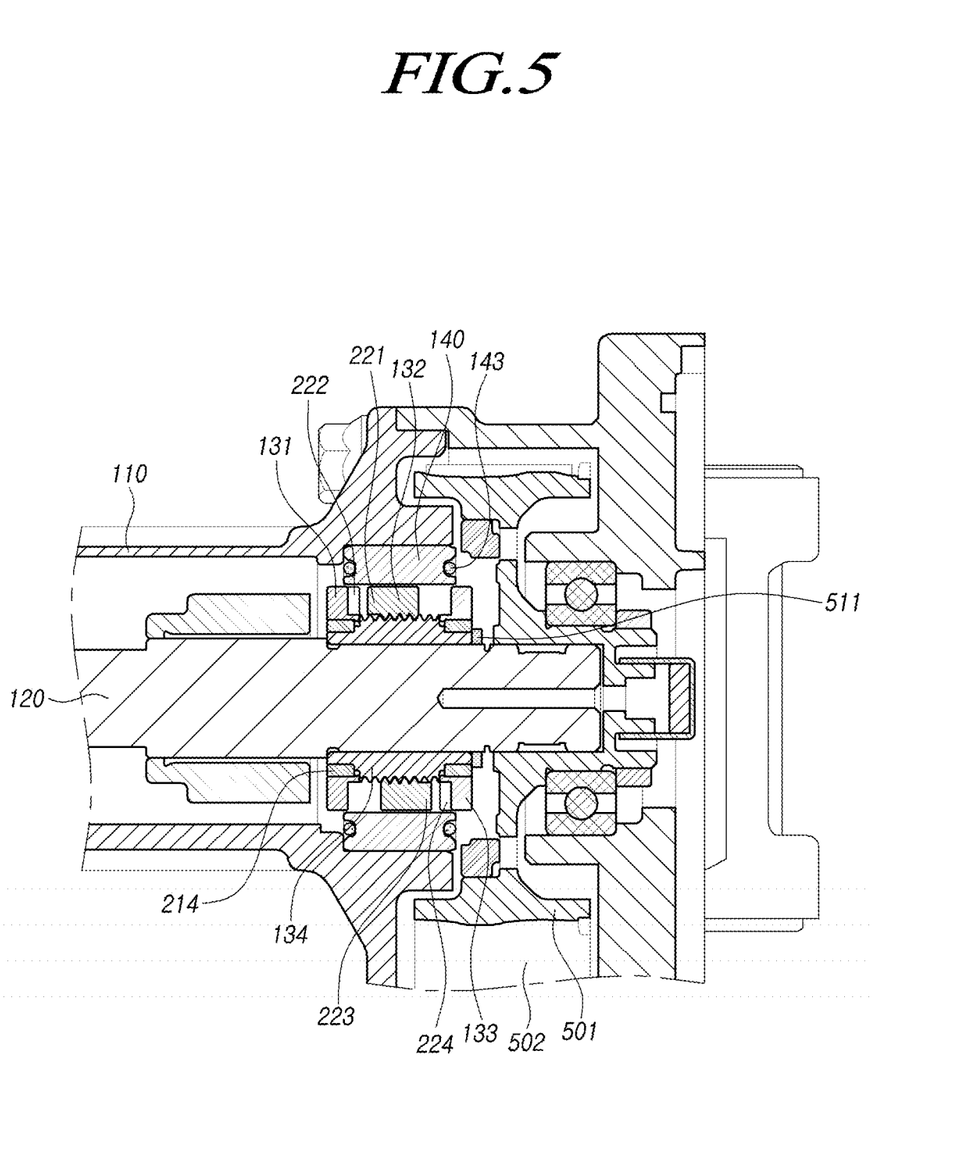
FIG. 5 is a cross-sectional view of the steer-by-wire steering apparatus according to embodiments of the present disclosure.
Figure 6:
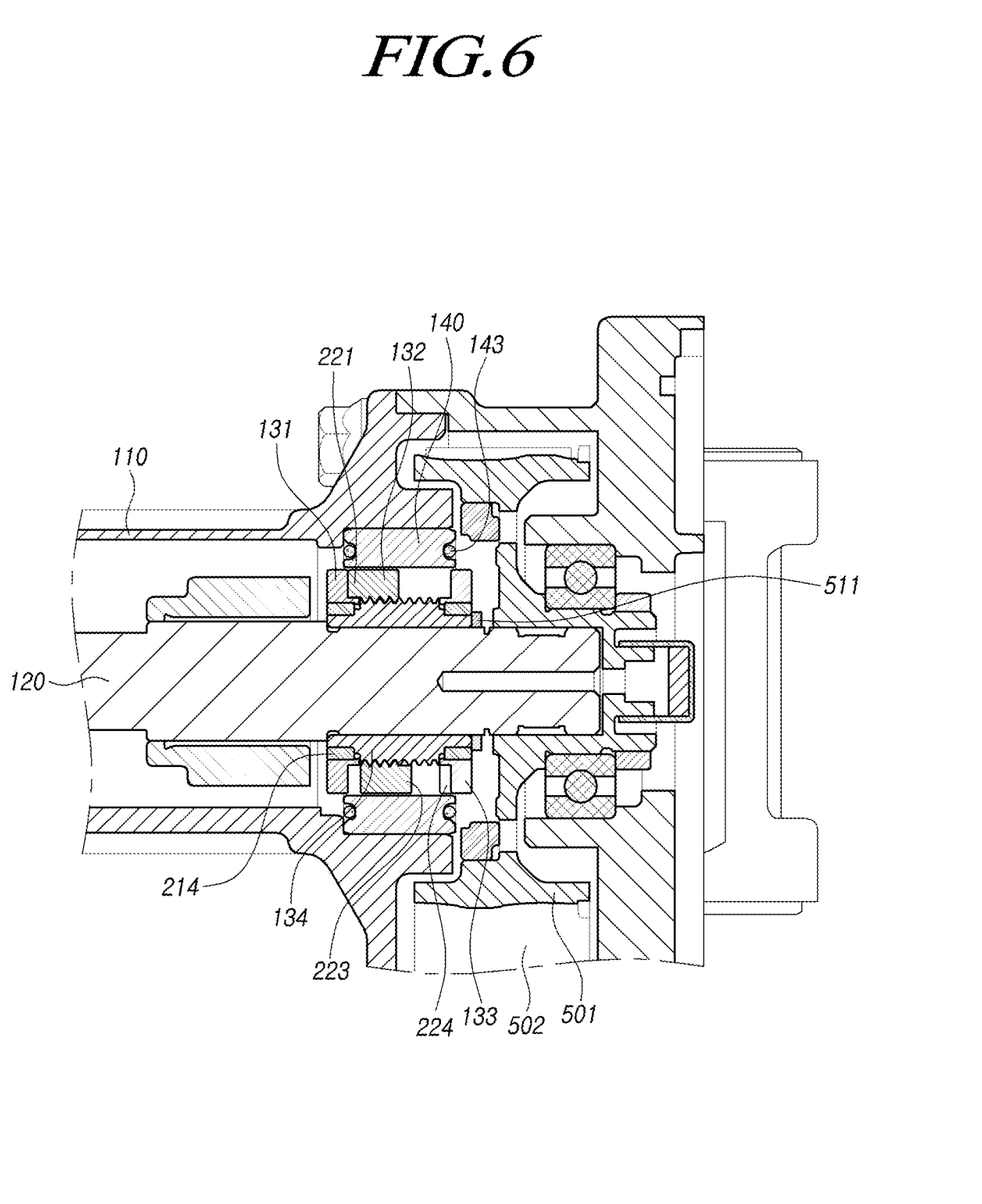
FIGS. 6 and 7 are cross-sectional views illustrating operation states of FIG. 5.
Figure 7:
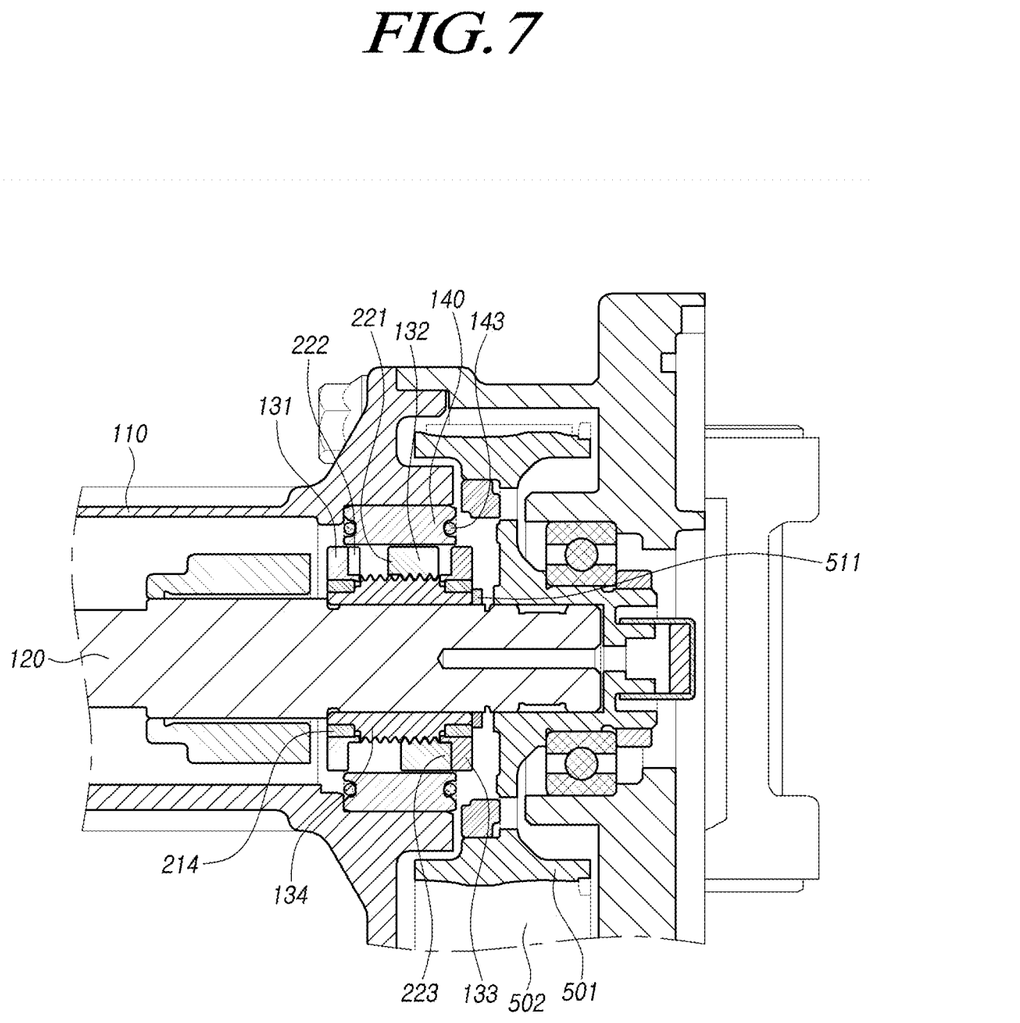

FIG. 1 is an exploded perspective view of a part of a steer-by-wire steering apparatus according to embodiments of the present disclosure, FIG. 2 is an exploded perspective view of a part of FIG. 1, FIG. 3 is a front view of an assembled position of FIG. 1, FIG. 4 is a perspective view of the assembled position of FIG. 2, FIG. 5 is a cross-sectional view of the steer-by-wire steering apparatus according to embodiments of the present disclosure, and FIGS. 6 and 7 are cross-sectional views illustrating operation states of FIG. 5.

The steer-by-wire steering apparatus 100 according to embodiments of the present disclosure includes: a leadscrew 134 coupled to a steering shaft 120 and having a first screw 201 provided on the outer circumferential portion thereof; a first stopper 131 coupled to one axial end portion of the leadscrew 134; a second stopper 133 coupled to the other axial end portion of the leadscrew 134; a nut 132 positioned between the first stopper 131 and the second stopper 133, coupled to the leadscrew 134, and having a second screw 202 provided on the inner circumferential portion thereof to engage with the first screw 201; and a hollow guide ring 140 provided between the housing 110 and the nut 132 and supported on the nut 132 in a circumferential direction.

Referring to FIGS. 1 and 2, a stopper assembly 130 includes the first stopper 131, the nut 132, the second stopper 133, and the leadscrew 134, and is coupled to the steering shaft 120.

The leadscrew 134 rotates together with steering shaft 120, and has the first screw 201 provided on the outer circumferential portion thereof. The nut 132 has the second screw 202 provided on the inner circumferential portion thereof, such that the first screw 201 engages with the second screw 202, and the leadscrew 134 is coupled to the nut 132.

The first stopper 131 is coupled to one axial end portion of the leadscrew 134, and the second stopper 133 is coupled to the other axial end portion of the leadscrew 134. That is, the nut 132 is provided between the first stopper 131 and the second stopper 133.

An embodiment in which the first stopper 131 is provided on a side directed toward the steering wheel of the leadscrew 134 and the second stopper 133 is provided on the opposite side is illustrated in the drawings. A configuration having the opposite arrangement is also possible.

The guide ring 140 is provided as a hollow structure, between the housing 110 and the nut 132. In other words, the stopper assembly 130 is provided inside the guide ring 140.

Since the guide ring 140 is supported on the nut 132 in the circumferential direction, when the steering shaft 120 and the leadscrew 134 are rotated by the steering wheel operation of a driver, the nut 132 is slid in the axial direction while not being rotated.

A first serration 121 is provided on the outer circumferential portion of the steering shaft 120, and a second serration 135 is provided on the inner circumferential portion of the leadscrew 134. The leadscrew 134 may be axially fixed by a lock nut 511 coupled to the steering shaft 120.

That is, the first serration 121 and the second serration 135 engage with each other. When the driver operates the steering wheel, the leadscrew 134 rotates together with steering shaft 120. Since and the nut 132 is supported on the guide ring 140 in the circumferential direction while the rotation of the nut 132 is limited, the nut 132 is axially slid by the first screw 201 and the second screw 202.

Meanwhile, each of the first screw 201 and the second screw 202 is implemented as a triangular screw, such that the threads may be more easily and precisely machined.

In general, the thread may have the shape of a rectangle, a trapezoid, a triangle, or the like. The rectangular or trapezoidal thread is widely used for power transmission. However, it is problematic in that the rectangular or trapezoidal thread is difficult to precisely machine compared to the triangular thread.

That is, since the nut 132 axially slides in response to the rotation of the leadscrew 134 in order to limit the rotation of the steering wheel within a maximum angle of rotation rather than transmitting power, it is possible to more easily and precisely machine the first screw 201 and the second screw 202 when each of the first screw 201 and the second screw 202 is implemented as a triangular thread instead of being implemented as a rectangular or trapezoidal thread (see FIGS. 5 and 7).

Next, the first stopper 131 and the second stopper 133 are coupled to the leadscrew 134 to rotate therewith. When the driver's operation of the steering wheel reaches the maximum angle of rotation as will be described later, the first stopper 131 may be supported on the nut 132, axially slid to one side, in the circumferential direction, or the second stopper 133 may be supported on the nut 132, axially slid to the other side, in the circumferential direction.

Since the rotation of the nut 132 is limited by the guide ring 140 as described above, as the first stopper 131 or the second stopper 133 is supported on the nut 132 in the circumferential direction, the rotation of the leadscrew 134 to which the first stopper 131 and the second stopper 133 are coupled is limited. Consequently, the driver can be prevented from operating the steering wheel beyond the maximum angle of rotation.

Since the driver is mechanically prevented from operating the steering wheel beyond the maximum angle of rotation by the stopper assembly 130 and the guide ring 140, a reaction force motor generating the feeling of steering in response to friction, bumping, or the like of the wheels on the road by transferring torque to the steering shaft using a nut pulley 510, a belt 502, and the like is not required to have enough power to cancel the steering torque of the driver at the maximum angle of rotation of the steering wheel. Thus, the size of the reaction force motor may be reduced, which is advantageous in terms of weight, cost, and packaging.

In addition, as the function of a vehicle is expanding, not only an airbag but also wiring for controlling a variety of functions is disposed inside the steering wheel. In general, such wiring is provided in the shape of clock springs. Such clock springs are wound or unwound when the driver operates the steering wheel. Limiting the angle of rotation of the steering wheel within the maximum angle of rotation can prevent the angle of rotation of the steering wheel from being excessively great and thus the clock springs from being damaged thereby.

In addition, since the guide ring 140 is supported on the inner circumferential portion of the housing 110 and the stopper assembly 130 is provided inside the guide ring 140, axially fitting the guide ring 140 and the stopper assembly 130 together may be completed within the housing 110, such that neither the guide ring 140 nor the stopper assembly 130 protrudes from the housing 110 so as to reduce interference with surrounding components. Accordingly, the steering apparatus can be designed in a variety of structures.

In addition, since the guide ring 140 has a hollow shape, the guide ring 140 may be simply fabricated by sintering and forging.

The guide ring 140 may be coupled to the housing 110 by insert members 150. That is, first insert recesses 111 are provided in the inner circumferential portion of the housing 110, and second insert recesses 141 corresponding to the first insert recesses 111 are provided in the outer circumferential portion of the guide ring 140. Thus, the insert members 150 may be inserted into the first insert recesses 111 and the second insert recesses 141.

The first insert recesses 111 and the second insert recesses 141 are axially provided. The guide ring 140 is supported on the inner circumferential portion of the housing 110 such that the first insert recesses 111 and the second insert recesses 141 face each other. The insert members 150 are inserted into the first insert recesses 111 and the second insert recesses 141. Thus, the guide ring 140 may be easily inserted into the housing 110.

Two first insert recesses 111 and two second insert recesses 141 may be provided. As the insert members 150 are inserted into the first insert recesses 111 and the second insert recesses 141, the guide ring 140 is fixed to the housing 110 in the circumferential direction so that the rotation of the guide ring 140 is limited.

Although an embodiment in which each of the first insert recesses 111 and the second insert recesses 141 is in the shape of a rectangular recess and each of the insert members 150 is provided as a rectangular column is illustrated in the figures, the present disclosure is not necessarily limited thereto.

In order to limit the rotation of the nut 132 so that the nut 132 slides only in the axial direction as described above, first protrusions 142 may be provided on the inner circumferential portion of the guide ring 140, and second protrusions 231 may be provided on the outer circumferential portion of the nut 132 to be supported on the first protrusion 142.

Referring to FIG. 3, the stopper assembly 130 and the guide ring 140 are fitted to each other, and the first protrusions 142 and the second protrusions 231 are supported on each other in the circumferential direction. Thus, during rotation of the leadscrew 134, the nut 132 slides only in the axial direction.

The second protrusions 231 are provided on both sides of the first protrusions 142 in the circumferential direction. Thus, rotation of the nut 132 to one side or the other side in the circumferential direction is limited.

In addition, two or more first protrusions 142 may be provided. As illustrated in the figures, the first protrusions 142 may be provided on the upper and lower portions in the figures, and the second protrusions 231 may be provided on both sides of the first protrusions 142.

As a plurality of first protrusions 142 and a plurality of second protrusions 231 are provided such that the first protrusions 142 are in surface contact with the second protrusions 231, the support areas of the first protrusions 142 and the second protrusions 231 may be increased to prevent stress concentration. Thus, this configuration is advantageous in terms of strength.

In addition, elastic members 143 may be coupled to the first protrusions 142 and supported on the second protrusions 231 in order to reduce friction and noise occurring between the first protrusions 142 and the second protrusions 231 when the nut 132 slides in the axial direction.

Each of the elastic members 143 may be implemented as an O-ring that is elastically deformable. Each of the O-rings may be coupled to a side surface of the corresponding first protrusion 142, and be provided between the first protrusion 142 and the second protrusions 231.

Meanwhile, as described above, coupling holes 211 into which the leadscrew 134 is inserted are provided in the first stopper 131 and the second stopper 133 provided on both sides of the nut 132 in the axial direction to limit the driver's operation of the steering wheel within the maximum angle of rotation, such that both ends of the leadscrew 134 are inserted into the coupling holes 211.

In addition, first coupling recesses 212 are provided in the inner circumferential portions of the first stopper 131 and the second stopper 133, second coupling recesses 213 corresponding to the first coupling recesses 212 are provided on one and the other axial end portions of the leadscrew 134. Coupling members 214 may be inserted into the first coupling recesses 212 and the second coupling recesses 213.

That is, the first coupling recesses 212 and the second coupling recesses 213 are provided in the axial direction. Both end portions of the leadscrew 134 are inserted into the first stopper 131 and the second stopper 133 such that the first coupling recesses 212 and the second coupling recesses 213 face each other. The coupling members 214 are inserted into the first coupling recesses 212 and the second coupling recesses 213. The first stopper 131 and the second stopper 133 may be fitted to the leadscrew 134 in a simple manner (see FIG. 4).

Here, the nut 132 should be fitted to the leadscrew 134 before the first stopper 131 and the second stopper 133 are fitted to each other.

Four first coupling recesses 212 and four second coupling recesses 213 may be provided. As the coupling members 214 are inserted into the first coupling recesses 212 and the second coupling recesses 213, the first stopper 131 and the second stopper 133 are fixed to the leadscrew 134 in the circumferential direction so as to rotate together with the leadscrew 134.

Although an embodiment in which each of the first coupling recesses 212 and the second coupling recesses 213 has a semicircular shape and each of the coupling members 214 has a cylindrical shape is illustrated in the figures, the present disclosure is not necessarily limited thereto.

In addition, first to fourth support portions 221, 222, 223, and 224 may be provided on the nut 132, the first stopper 131, and the second stopper 133, such that the first stopper 131 or the second stopper 133 is supported on the nut 132 in the circumferential direction when the operator' operation of the steering wheel reaches the maximum angle of rotation.

FIG. 5 illustrates a state in which the steering wheel is not rotated, in which the nut 132 is positioned at the center between the first stopper 131 and the second stopper 133.

FIG. 6 illustrates a state in which the nut 132 has slid to one side in the axial direction to be supported on the first stopper 131 as the driver operates the steering wheel.

That is, the first support portion 221 is provided on one side portion of the nut 132 to protrude while being circumferentially inclined, and the second support portion 222 is provided on the other side portion of the nut 132 to protrude while being circumferentially inclined (see FIG. 2). When the nut 132 slides to one side in the axial direction, the first support portion 221 and the second support portion 222 may be supported, and the driver's operation of the steering wheel may be limited within the maximum angle of rotation.

FIG. 7 illustrates a state in which the nut 132 has slid to the other side in the axial direction to be supported on the second stopper 133 in response as the driver operates the steering wheel in the opposite direction.

That is, the third support portion 223 is provided on the other side portion of the nut 132 to protrude while being circumferentially inclined, and the fourth support portion 224 is provided on one side portion of the second stopper 133 to protrude while being circumferentially inclined (see FIG. 2). When the nut 132 slides to the opposite side in the axial direction, the third support portion 223 and the fourth support portion 224 may be supported, and the driver's operation of the steering wheel may be limited within the maximum angle of rotation.

Each of the first to fourth support portions 221, 222, 223, and 224 includes a slope surface circumferentially inclined and a vertical surface parallel to the axial direction. The rotation of the steering shaft 120 is limited while the vertical surface of the first support portion 221 and the vertical surface of the second support portion 222 are supported or the vertical surface of the third support portion 223 and the vertical surface of the fourth support portion 224 are supported. Consequently, the driver's operation of the steering wheel beyond the maximum angle of rotation is prevented.

According to the steer-by-wire steering apparatus having the above-described configuration, the driver's operation of the steering wheel can be limited within the minimum angle of rotation so as to improve driver's feeling of steering and prevent a clock spring disposed on the steering wheel from being damaged. Parts of the steering apparatus can be more easily fabricated and machined and more simply fitted together, and the interference of the parts with surrounding components can be reduced. The steer-by-wire steering apparatus can be designed in a variety of structures and advantageous for packaging.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the national stage of International Patent Application No. PCT/KR2020/007887 filed on Jun. 18, 2020, which claims under 35 U.S.C. § 119 (a) the benefit of priority to Korean Patent Application No. 10-2019-0073267, filed on Jun. 20, 2019, which is hereby incorporated by reference for all purposes as if fully set forth herein. In addition, when this application claims priority in countries other than the U.S.A. on the same basis, the entire content of which is hereby incorporated by reference.

The invention claimed is:

1. A steer-by-wire steering apparatus comprising:
a leadscrew coupled to a steering shaft and comprising a first screw provided on an outer circumferential portion thereof;
a first stopper and a second stopper coupled to one axial end portion and the other axial end portion of the leadscrew, respectively;
a nut positioned between the first stopper and the second stopper, coupled to the leadscrew, and comprising a second screw provided on an inner circumferential portion thereof to engage with the first screw; and
a hollow guide ring provided between a housing and the nut and supported on the nut in a circumferential direction,
wherein first insert recesses are provided in an inner circumferential portion of the housing, and second insert recesses corresponding to the first insert recesses are provided in an outer circumferential portion of the guide ring,
the guide ring being coupled to the housing by insert members inserted into the first insert recesses and the second insert recesses.

2. The steer-by-wire steering apparatus of claim 1, wherein a first serration is provided on an outer circumferential portion of the steering shaft, and a second serration engaging with the first serration is provided on an inner circumferential portion of the leadscrew.

3. The steer-by-wire steering apparatus of claim 1, wherein each of the first screw and the second screw comprises a triangular screw.

4. The steer-by-wire steering apparatus of claim 1, wherein a first protrusion is provided on an inner circumferential portion of the guide ring, and a second protrusion is provided on an outer circumferential portion of the nut to be supported on the first protrusion.

5. The steer-by-wire steering apparatus of claim 4, wherein the second protrusions are provided on both sides of the first protrusion in a circumferential direction.

6. The steer-by-wire steering apparatus of claim 4, wherein the first protrusion comprises two or more protrusions.

7. The steer-by-wire steering apparatus of claim 4, wherein an elastic member supported on the second protrusions is supported on the first protrusion.

8. The steer-by-wire steering apparatus of claim 1, wherein each of the first stopper and the second stopper comprises a coupling hole into which the leadscrew is inserted.

9. The steer-by-wire steering apparatus of claim 8, wherein first coupling recesses are provided in inner circumferential portions of the first stopper and the second stopper, and second coupling recesses corresponding to the first coupling recesses are provided on one and the other axial end portions of the leadscrew, and the first stopper and the second stopper are coupled to the leadscrew by coupling members inserted into the first coupling recesses and the second coupling recesses.

10. The steer-by-wire steering apparatus of claim 8, wherein a first support portion is provided on one side portion of the nut to protrude while being circumferentially inclined, and a second support portion is provided on the other side portion of the nut to protrude while being circumferentially inclined.

11. The steer-by-wire steering apparatus of claim 8, wherein a third support portion is provided on the other side portion of the nut to protrude while being circumferentially inclined, and a fourth support portion is provided on one side portion of the second stopper to protrude while being circumferentially inclined.

* * * * *